Patented June 10, 1930

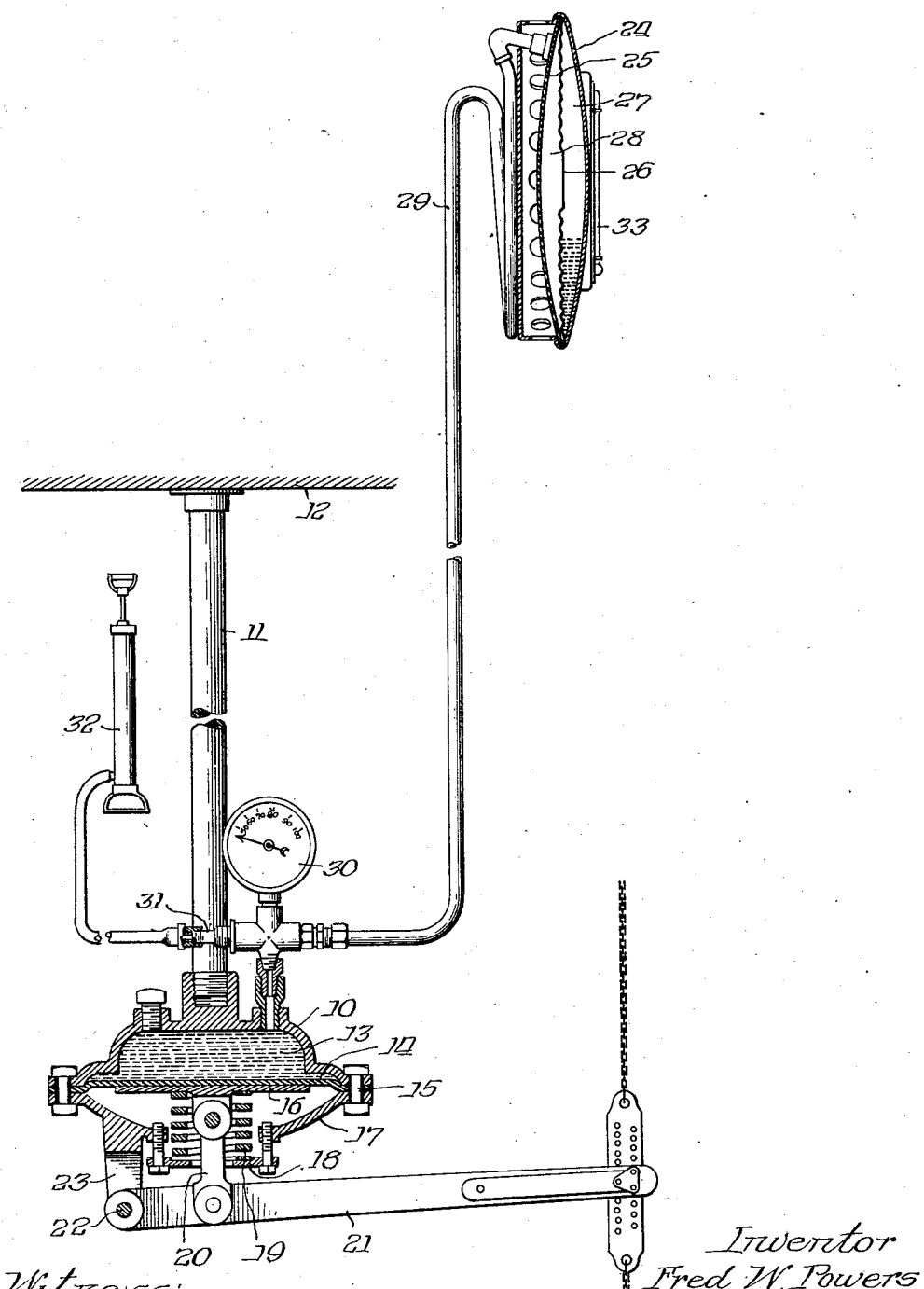

1,763,180

UNITED STATES PATENT OFFICE

FRED W. POWERS, OF CHICAGO, ILLINOIS, ASSIGNOR TO POWERS REGULATOR COMPANY, OF CHICAGO, ILLINOIS, A CORPORATION OF ILLINOIS

THERMOSTATIC REGULATOR

Application filed October 5, 1928. Serial No. 310,577.

My invention relates to regulators and particularly to an improvement on the regulator described in the prior patent to W. P. Powers, No. 416,947 of December 10, 1889.

Regulating devices similar to those shown in the patent above identified have been in successful operation since before the date of said patent. However, my invention relates to means for rendering the apparatus more sensitive and positive in action, and for simplifying the matter of installation.

In the apparatus as heretofore constructed, it has been necessary to subject the thermostatic motor to a chilling process during installation in order to contract as far as possible the volatile substance used as a thermostatic fluid, the air chambers being subject to atmospheric pressure. When the thermostat was thoroughly chilled, the air chambers were closed and sealed and the thermostat then allowed to return to normal temperature conditions. This involved considerable delay and inconvenience, which is obviated in the construction described herein. By developing in the air chambers a pressure greater than atmospheric, providing a pressure gauge and correlating the gauge pressure to the temperature effective on the thermostat, a sensitive, high pressure system is provided that will be more effective and positive than the apparatus heretofore known.

The invention will be more readily understood by reference to the drawing, in which the figure is a sectional view through apparatus constructed in accordance with my invention.

The diaphragm or damper operating motor comprises a casing 10 which may be supported by means of a pipe 11 from the ceiling 12. The casing provides an air chamber, preferably partially filled and sealed with a liquid 13 such as water, the chamber being closed at the bottom by means of a rubber diaphragm 14, held at its marginal edges by bolts 15, and acting on a disc 16; a spider 17 and a cross-head 18, support a compression spring 19 that resists the downward movement of the disc. A link 20 connected to the disc acts on an arm 21 pivoted at 22 to a bracket 23, the arm being connected at its outer end with suitable damper-operating devices, not shown.

In other forms of the invention, the diaphragm acts directly to open or close a steam valve or other heat controlling means.

The thermostatic motor is of generally circular shape, comprising rigid outer walls 24, 25 joined at their peripheries, and a flexible diaphragm 26 mounted between the walls and serving to provide two non-communicating chambers 27—28. The chamber 27 contains a volatile liquid or expansive fluid that is affected by the desired temperatures to which it is to be subjected. The space 28 constitutes an air chamber which is in communication with the air chamber 13 by means of the flexible pipe 29, the length of which will be determined according to the distance necessarily separating the thermostat from the diaphragm motor.

Located in the air line at some point between the air chambers is a gauge 30. This is preferably located at the point shown, that is, immediately above the diaphragm motor. A valve and hose connection 31 provides for the admission of air under pressure into the system, a simple means for developing such air pressure being the hand pump 32. The pressure gauge is calibrated to represent pressures that will be developed by varying temperatures to which the thermostat is subjected. Preferably the figures on the gauge as shown in the drawing, are the same as those on the thermometer. Thus the temperature of the distant room is indicated visually on the gauge. A thermometer, indicated at 33 will be provided on the thermostat motor, the thermometer being subject to the temperature of the space within which the thermostat is located.

In installing the device, the parts being positioned as shown, and the thermostatic motor having adjusted itself to the temperature of the space within which it is located, the pump is connected and pressure supplied to the system until the pointer on the gauge indicates figures or marks which correspond to the temperature indicated by the thermometer on the thermostatic motor. The system being then tightly sealed, the operation will be automatic and continuous thereafter and variations in the temperature of the space within which the thermostat is located will be visually indicated on the gauge. Thus, in future operation, the pressure may be carefully watched and any loss of air that may occur from time to time may be compensated for by connecting the pump and increasing the pressure.

A system constructed in the manner described will be found to be efficient in operation and very easily installed.

Other means than those shown may be utilized for accomplishing the desired result and I do not wish to be limited except as indicated in the appended claims.

I claim:

1. In combination, a diaphragm motor having an air chamber, a heat controlling element operated by said motor, a self contained thermostatic motor including means providing an expansible fluid chamber, an air chamber and a diaphragm seperating said chambers, a conduit joining the air chambers of said motors, a gauge affected by the air pressure in said chambers, said gauge being calibrated to indicate variations in pressure in direct relation to variations in temperature that are effective on said thermostatic motor, and means for initially developing in said air chambers a pressure that shall cause said gauge to indicate a figure corresponding to the temperature in degrees that is then effective on said thermostatic motor.

2. In a device of the class described, the combination of a diaphragm motor, means associated therewith for providing an air chamber, a thermostatic motor, also including an air chamber, a conduit connecting said chambers, a thermometer associated with said thermostatic motor, said thermostatic motor and thermometer being adapted to be located in the space the temperature of which is to be controlled, a gauge in communication with said air chambers, said gauge being calibrated to indicate pressure variations in direct relation to temperature variations effective on said thermostatic motor and indicated by said thermometer, and means for initially developing in said chambers a pressure that will cause said gauge to indicate pressure variations in the same ratio as the temperature varies in the space.

3. In a device of the class described, the combination of a diaphragm motor, means associated therewith for providing an air chamber, a thermostatic motor also including an air chamber, a conduit connecting said chambers, a thermometer associated with said thermostatic motor, said thermostatic motor and thermometer being adapted to be located in the space the temperature of which is to be controlled, a gauge in communication with said air chambers and located immediately adjacent to said diaphragm motor, said gauge being calibrated to indicate presure variations in direct relation to temperature variations effective on said thermostatic motor and indicated by said thermometer.

In testimony whereof I have affixed my signature.

FRED W. POWERS.